(12) United States Patent
Wong et al.

(10) Patent No.: US 6,785,844 B2
(45) Date of Patent: Aug. 31, 2004

(54) AUTOMATED TEST SYSTEM AND METHOD FOR COMPUTER FACTORY INSTALL ENVIRONMENT

(75) Inventors: William H. Wong, Round Rock, TX (US); Christopher J. Bozack, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 687 days.

(21) Appl. No.: 09/770,565

(22) Filed: Jan. 26, 2001

(65) Prior Publication Data

US 2002/0104042 A1 Aug. 1, 2002

(51) Int. Cl.[7] ................................................. H02H 3/05
(52) U.S. Cl. ........................................ 714/25; 702/186
(58) Field of Search ............................ 714/25, 2, 4, 37, 714/38, 39; 717/171, 174, 176, 178, 168, 173; 709/223–225, 220, 221, 222; 702/183, 184, 185, 186, 187, 188

(56) References Cited

U.S. PATENT DOCUMENTS

| | | | |
|---|---|---|---|
| 5,021,997 A | | 6/1991 | Archie et al. |
| 5,872,909 A | * | 2/1999 | Wilner et al. .................. 714/38 |
| 5,889,955 A | * | 3/1999 | Shinozaki et al. ........... 709/224 |
| 5,909,544 A | * | 6/1999 | Anderson et al. ............ 709/208 |
| 6,002,869 A | * | 12/1999 | Hinckley ..................... 717/124 |
| 6,047,389 A | * | 4/2000 | Thai .............................. 714/38 |
| 6,643,657 B1 | * | 11/2003 | Baird et al. .................. 707/100 |
| 6,671,757 B1 | * | 12/2003 | Multer et al. ................ 710/100 |

* cited by examiner

*Primary Examiner*—Dieu-Minh Le
(74) *Attorney, Agent, or Firm*—Haynes and Boone, LLP

(57) ABSTRACT

A computer system factory download automated test process architecture includes an automated test system server (ATS Server), an automated test control center (ATCC) software program operable within the ATS Server for performing prescribed functions of a factory download automated test process, and an automated test machine (ATM) having a processor, a bootable device, and automated test machine client software, the bootable device for storing the ATM client software, and the processor for executing the ATM client software, in response to a prescribed boot, for controlling an operation of a prescribed download/test process of a respective ATM during the factory download automated test process, and for a respective ATM, the ATM client software for 1) retrieving installation files and test instructions from the ATCC, 2) passing control to the respective ATM upon a receipt of the installation files and test instructions for the ATM to perform at least one automated test according to the installation files and test instructions, 3) responsive to regaining a control subsequent a performance of the automated test by the ATM, the ATM client software for copying any test result files generated by the ATM during the automated test to the ATCC, and 4) awaiting any instructions for any further download/test process from the ATCC.

22 Claims, 3 Drawing Sheets

ATM Process Flow

AUTOMATED TEST SYSTEM AND METHOD FOR COMPUTER FACTORY INSTALL ENVIRONMENT

BACKGROUND

The disclosures herein relate generally to computer systems and more particularly to test methodologies in a computer system factory install environment.

Conventional methodologies in computer system factory install environments suffer from slow project throughputs, as well as lengthy overall test times. Such slow project throughputs and lengthy overall test times increase a manufacturer's time to market, especially in connection with new products, including hardware and software. In addition, conventional test methods in a computer system factory install environment involve having test technicians manually test products for factory install script defects. While such methods have been used to validate products in the past, the methods have proven to be a non-cost effective and error-prone processes. Peak workload periods dictate added cost in hiring new technicians/contractors, whereas a lull in workload causes costly down time.

Accordingly, a need exists for improved test methodologies in a computer system factory install environment.

SUMMARY

An automated test system for use in a factory install environment includes an automated test control center, at least one automated test system server, at least one web terminal, and a plurality of automated test machines.

DETAILED DESCRIPTION

Figure 1:
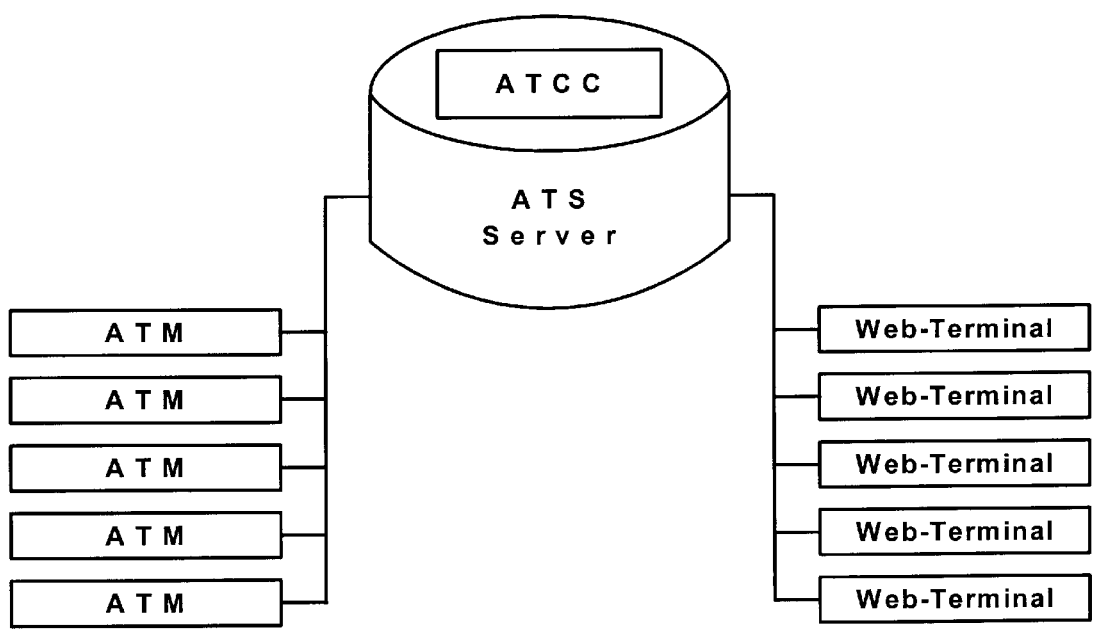
FIG. 1 illustrates a block diagram view of an automated test system architecture according to an embodiment of the present disclosure.

The present embodiments provide an integrated solution of automated test with a custom configured computer system manufacturer's unique factory install environment. The solution of the present embodiments is independent of any third-party automated software test package that may be used for actual testing.

According to one embodiment, a Factory Install (FI) Automated Test System (ATS) architecture involves at least four components: an Automated Test Control Center (ATCC), an Automated Test Machine (ATM) client, an ATS Server, and a web-based terminal.

The ATCC includes a web-based application residing on the ATS Server. The ATCC acts as the centralized point of contact for all ATMs, whereby the ATCC remotely coordinates all test efforts amongst all available ATMs. Accordingly, the ATCC handles the scheduling of downloads, initiating ATMs for performing downloads/automated test, monitoring status, providing e-mail/pager alerts, and collecting all relevant test results for subsequent review (or for archival purposes).

The ATCC also incorporates a number of scheduling heuristics for intelligently assigning test downloads as a function of a set of variables. The set of variables can include one of more of the following: available ATMs meeting minimum test requirements, current test load, weights, and priority.

The ATM client includes a software application (i.e., ATM Client Software) residing on a respective test system. The ATM client provides communication between a respective test unit and the ATCC. The ATM client serves as the remote control mechanism that the ATCC relies upon for providing system updates, performing specific instructions, and uploading test results.

Initially, a test system launches into the ATM client and awaits further instructions from the ATCC. When the ATM client receives a test download request from the ATCC, a series of events occur to prepare the ATM for download and the ATM client software relinquishes control to the test system. During the download process, the ATM client launches in several instances to report status and perform any additional actions as requested by the ATCC. For example, additional actions may include copying files to/from the ATS Server. Upon a completion of the test download process, the ATM client re-launches itself to upload test results and wait for a next download.

According to an embodiment of the present disclosure, the automated test system infrastructure also includes at least one web-based terminal. The web-based terminal includes a remotely accessible web-application for providing a user interface into the ATCC. The web-based terminal facilitates the submission/retrieval of test cases. In addition, the user interface into the ATCC allows easy access for viewing of a current status of some or all ATMs. Further detail on each ATM, such as test case information, can also be obtained from the same user interface. The web-based terminals also serve to populate the ATS Server database with test cases that the ATS Server database provides to the ATCC. Test case results can be later reviewed once a respective test case has been performed, within the same interface.

A test scheduling functionality within the ATCC dispatches the test cases to remote ATM machines based upon various prescribed characteristics. The prescribed characteristics include one or more of the following: numerical weights determined by hardware configurations and performance history of a respective machine; supported operating system (OS) and hardware combinations; number of queued test cases waiting for each machine; and test case priority.

Unlike conventional methods that include server controlled client test machines, the ATS extends beyond such conventional methods by allowing remote web clients to control the behavior of the ATS Server that ultimately controls the ATMs or client boxes.

In operation, a client machine conducts a test and posts results to the ATS Server. The ATCC then analyzes the corresponding test result data and has an ability to issue subsequent client commands based upon an outcome of previously performed tests, as a function of prescribed test criteria.

The ATM client program (i.e., ATM client software) initially resides upon a bootable device or similar computer readable media. The ATM client program moves into a RAM drive and the contents on the bootable device are erased. Dynamically generated files, including an appropriate ATM client program, are subsequently copied onto the bootable device in preparation for the performing of a next network OS/Application software download.

According to one embodiment of the present disclosure, the infrastructure allows for system re-boots and includes an ability to pass control to alternative devices, for example, a hard drive or other device.

Automated Test System Infrastructure

According to another embodiment, the Automated Test System (ATS) infrastructure includes at least four components: ATMs, ATS Server, ATCC, and web terminals.

The ATS includes capability for operating according to various prescribed processes. According to one process, the ATS coordinates the following sequence of actions. Individuals, such as test design engineers, submit tests through one or more of the web terminals. The users can select hardware/software configurations and tests to be executed. The ATS places the hardware/software configurations and test information into a database located on the ATS Server. The ATCC extracts the test criteria stored on the ATS Server and selects a machine (i.e., one of the ATMs) for running the corresponding test. A particular ATCC selection factors in hardware configurations and current test loads distributed amongst the ATM test machines.

Figure 2:
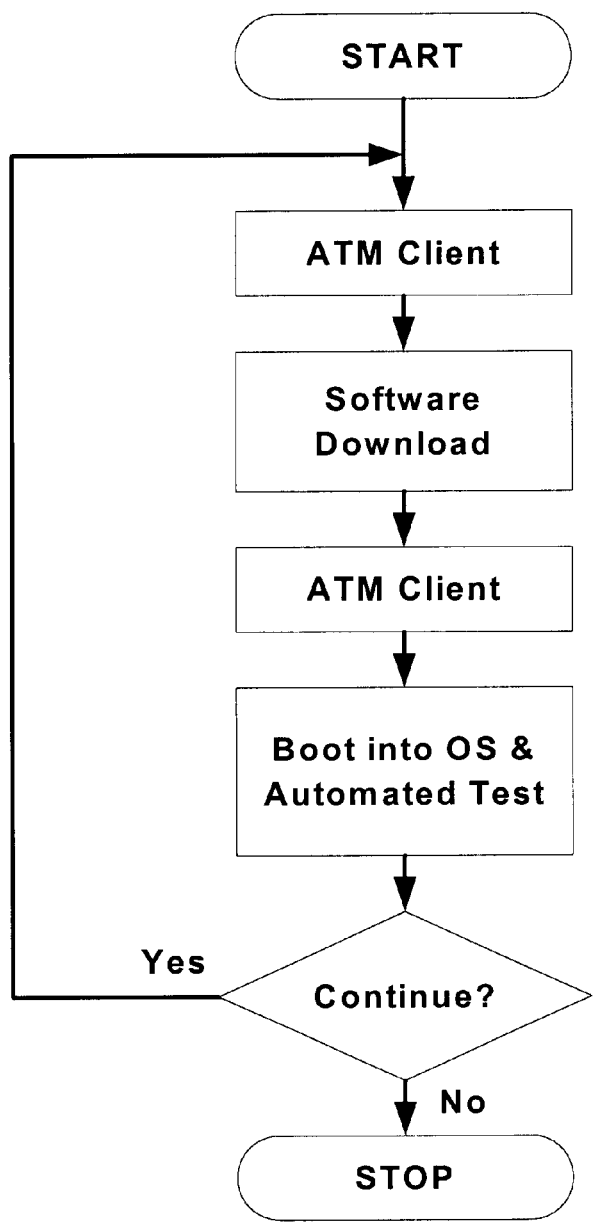
FIG. 2 illustrates a flow diagram view of an automated test machine process flow according to an embodiment of the present disclosure.

Upon selection of the machine, the factory download automated test process of FIG. 2 is executed. The ATMs communicate with the ATCC via the ATM client throughout the download and testing process. At any point during the factory download automated test process, users (e.g., test engineers) can view the status of the download and interact with the tests via respective web terminals. Upon a completion of the testing at a given ATM machine, the ATM client of the respective ATM machine sends and posts the results on the ATS Server for archiving. Subsequent to a completion of the ATS process, users can go to the web terminals and view results of the tests. The ATS Server contains all information pertaining to a current state of the ATMs and any respective download/test. The ATS Server also maintains archival storage of (or holds) the historical data of the tests and corresponding ATMs.

Example

User1 wants to run test1, test2, and test3. Test1 might include, for example, a script for opening a third party program (e.g., Microsoft™ Word™) and tests its run time functionality, along with testing the Operating System (e.g., Windows 2000™) to make sure that registry entries are correct.

In addition, Test1 requires a first configuration (e.g., configurations1), test2 requires a second configuration (e.g., configuration2), and test3 requires a third (e.g., configuration3). An exemplary configuration might include a computer having a Pentium processor, a modem, a CD-R drive, at least a 10 gigabyte hard drive, 64 megabytes of RAM, and a sound card, further having an ability to run Microsoft™ Word™ and Windows 2000™.

In continuation of the above example, User1 submits the tests with their respective configurations on web terminals. Test1, test2, and test3 are stored within the ATS Server. The ATCC extracts the data for test1, test2, and test3 from the ATS Server. The ATCC queries the ATS Server and notes that ATM1, ATM2, and ATM3 are available for testing. ATM1 and ATM2 are a suitable option for configurations. Consulting the ATS Server, the ATCC determines that ATM1 has 8 tests yet to run, while ATM2 has 7 tests.

In addition, analyzing past performances of the ATMs stored in the ATS Server, the ATCC further determines that ATM1 is a better option than ATM2 because ATM1 is more efficient in its test execution. Accordingly, the ATCC assigns test1 to ATM1 while still having the option to reassign test1 to a different ATM at a later time if circumstances and/or conditions change. The ATCC assigns the other two tests in a similar manner. User1 subsequently (for example, ten minutes later) views the status of test1 on web terminal2. Seeing that test1 is ninth ($9^{th}$) in the queue brings comfort to user1, and user1 goes to sleep.

Meanwhile, ATM Client1 contacts the ATCC with a message stating that ATM1 is ready to run test1. The ATCC issues the commands to copy the machine installation files to ATM Client1. ATM Client1 copies the initiation files and starts the install. During install, control goes to the ATM. After install, the ATM invokes ATM Client1. ATM Client1 informs the ATCC that ATM1 is ready for test1. ATM1 runs test1. During execution of test1, the ATM has control. Upon completion of test1, ATM Client is again given control. ATM Client1 then outputs results files to the ATS Server and alerts the ATCC that the corresponding test has finished.

The ATCC archives and/or analyzes the results. Based upon the analyses, the ATCC launches subsequent tests 4 and 5 on ATM2 and ATM3. The ATCC accordingly follows a similar course of action for each of tests 2, 3, 4, and 5.

In this example, user1 subsequently wakes up and goes to web terminal3 to view the status of test1, test2, and test3. User1 finds the results of those tests, along with results from the subsequently launched tests, i.e., test4 and test5. Based upon the results of the tests, User1 submits a further subsequent test, i.e., test6.

Inside the ATM

Figure 3:
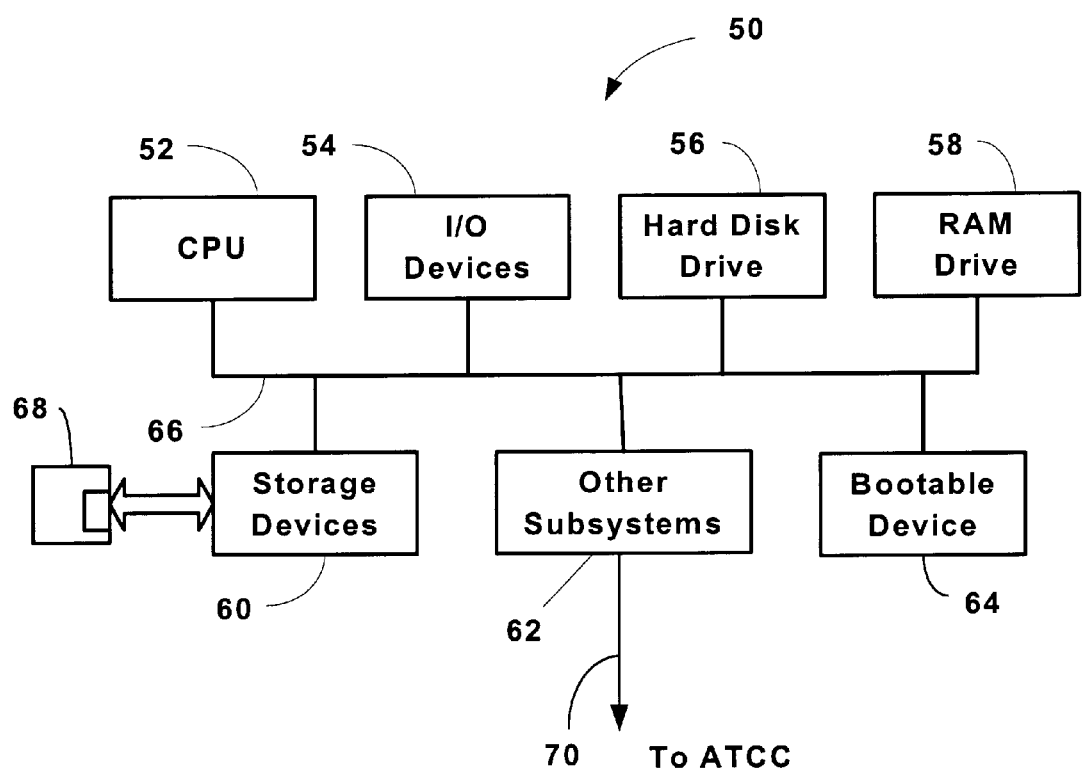
FIG. 3 illustrates a block diagram view of an exemplary automated test machine computer system according to an embodiment of the present disclosure.

Referring now to FIG. 3, a system block diagram of a automated test machine computer system 50 is shown having components for use in accordance with the method and apparatus of the present disclosure. The computer system includes a central processing unit (CPU) 52, input/output (I/O) devices, such as a display, a keyboard, a mouse or other pointer device, and associated controllers, collectively designated by a reference numeral 54, a hard disk drive 56, a RAM drive 58, and other storage devices, such as may include a floppy disk drive, CD-ROM drive, and the like, collectively designated by reference numeral 60, and various other subsystems, such as a network interface card, collectively designated by reference numeral 62, and a bootable device 64 all interconnected via one or more buses, shown collectively as a bus 66. A computer readable media 68 (such as a floppy disk, CD-ROM, or the like) is also included. ATM 50 couples to the ATCC via connection 70.

Accordingly, each ATM machine includes at least one processor, a hard drive, a RAM drive, and a bootable device (i.e. floppy, hard drive, network drive). Each ATM further includes ATM Client software stored on a computer bootable device of the respective ATM machine. The ATM Client software includes instructions that, when executed by the processor, creates the RAM drive and copies itself over onto the bootable device. Each ATM machine may also include other components, not specifically mentioned herein for simplicity.

According to one embodiment, when the ATM is restarted (e.g., such as by a reset or similar hardware/software command function), the bootable device invokes the ATM Client software and operates (or runs) the ATM client from the RAM drive. The ATM client copies over all files specified by the ATCC onto the ATM's hard drive and bootable device. Note that the bootable device can include the hard drive or another device, other than the hard drive. Storing and running the ATM client from the RAM drive maintains a cyclic process, while allowing a flexibility to re-image the bootable device.

Factory Download Automated Test Process

An initial state of a testing machine is independent of the ATM's contents. To begin a factory download automated test process, the particular ATM machine is rebooted with the Automated Testing Machine (ATM) client residing on the bootable device of the respective machine. On boot up, the ATM client software is invoked and retrieves commands from the ATCC. The ATCC sends installation files to the ATM, via the ATM client. The ATCC also instructs the ATM client on how to start the download. After the ATM client returns control back to the testing machine, the actual download begins. When the installation is complete, the download process passes control to the ATM client. Upon receiving control, the ATM client connects to the ATCC and awaits any additional necessary files to download. Responsive to completion of receipt of the download files, the testing machine then boots into the operating system (OS) and performs any automated tests that have been downloaded. After the automated tests complete, the ATM client regains control and copies all test result files to the ATS Server. Subsequently, the ATCC informs the ATM client whether or not to start another download/test.

Example:

Consider a scenario in which ATM1 finishes a given test. A current state of ATM1 includes an operating system and prescribed applications loaded onto it. ATM Client1 has established connection to the ATCC. The ATCC issues ATM Client1 the commands to wipe (e.g., reformat) the hard drive and install a new set of operating system and applications. After installation, ATM Client1 alerts the ATCC that the operating system and applications have been loaded onto ATM1. The ATCC commands ATM Client1 to download some files to further initialize the system and run an automated test. The ATM Client1 then returns control to ATM1. ATM1 boots into the operating system and runs the automated test. During the automated test, certain test result files are created. Upon completion of the automated tests, ATM Client1 uploads the test result files to the ATS Server and awaits further commands from the ATCC.

According to an embodiment of the present disclosure, a computer system factory download automated test process architecture includes an ATS Server, an ATCC software program operable within the ATS Server for performing prescribed functions of a factory download automated test process, and at least one ATM. The ATM can include a plurality of ATMs, each of the ATMs characterized by a prescribed configuration.

Further in connection with an ATM, the ATM includes at least one processor, at least one bootable device, and automated test machine client software. The bootable device stores the ATM client software. The processor executes the ATM client software, in response to a prescribed boot, and controls an operation of a prescribed download/test process of a respective ATM during a given factory download automated test process.

For a respective ATM, the ATM client software includes instructions for 1) retrieving installation files and test instructions from the ATCC, 2) passing control to the respective ATM upon receipt of the installation files and test instructions for the ATM to perform an automated test according to the installation files and test instructions, 3) responsive to regaining control subsequent to performance of the automated test by the ATM, the ATM client software for copying any test result files generated by ATM during the automated test to the ATCC, and 4) awaiting any instructions for any further download/test process from the ATCC.

According to another embodiment, the architecture further includes at least one remote web terminal. In one embodiment, the remote web terminal includes a plurality of terminals. The remote web terminal couples to the ATS Server and enables an access to the ATCC. The remote web terminal is further for use in formulating a desired download/test process for execution by one of the ATMs, according to a prescribed priority as determined by the ATCC. The remote web terminal is further for receiving results of a desired download/test process from a selected one of the ATMs via the ATCC.

In another embodiment, the ATCC is dispatches test cases to the ATMs according to a prescribed test schedule. A particular test schedule can be as a function of prescribed characteristics, wherein the prescribed characteristics include at least one of the following selected from: a) numerical weights determined as a function of a hardware configuration and performance history of a respective ATM, b) a supported operating system (OS) and hardware combination of a respective ATM, c) a number of queued test cases awaiting execution by a respective ATM, and d) a test case priority.

In addition, according to another embodiment, the ATM client software initially resides on a bootable device of the ATM. The client software further includes instructions processable by the processor of the ATM for moving the ATM client software to a RAM drive and erasing a content of the corresponding bootable device, dynamically generating files, including at least a version of the ATM client software, and copying the dynamically generated files onto the bootable device for performing a next operating system (OS)/ Application software download/test process as directed by the ATCC. The ATM client software further includes instructions for allowing ATM system re-boots and instructions for passing a control of the ATM to any one of the bootable devices of the bootable devices of a respective ATM. The ATM client software further includes instructions for conducting a prescribed automated test and for posting test results in the form of test result data of the prescribed automated download/test process to the ATCC on the ATS Server. In response, the ATCC analyzes the test result data and issues subsequent ATM client software instructions based upon an outcome of test result analyses of previously performed download/test processes.

Accordingly, the present embodiments provide an improvement to current test methodologies in a computer system factory install environment. Technical advantages gained include increased project throughput and reduced overall test time. Accordingly, a computer system manufacturer can reduce a time to market, as well as be among the first to market with the shipping of new software, in connection with one or more of its lines of business.

Although only a few exemplary embodiments have been described in detail above, those skilled in the art will readily appreciate that many modifications are possible in the exemplary embodiments without materially departing from the novel teachings and advantages described herein. Accordingly, all such modifications are intended to be included within the scope of the embodiment as defined in the following claims. In the claims, means-plus-function clauses are intended to cover the structures described herein as performing the recited function and not only structural equivalents, but also equivalent structures.

What is claimed:

1. A computer system factory download automated test process architecture comprising:

an automated test system server (ATS Server);

an automated test control center (ATCC) software program operable within the ATS Server for performing prescribed functions of a factory download automated test process;

an automated test machine (ATM) having a processor, a bootable device, and automated test machine client software, the bootable device for storing the ATM client software, and the processor for executing the ATM client software, in response to a prescribed boot, for controlling an operation of a prescribed download/test process of a respective ATM during the factory download automated test process, and for a respective ATM, the ATM client software for 1) retrieving installation files and test instructions from the ATCC, 2) passing control to the respective ATM upon a receipt of the installation files and test instructions for the ATM to perform at least one automated test according to the installation files and test instructions, 3) responsive to regaining a control subsequent a performance of the automated test by the ATM, the ATM client software for copying any test result files generated by the ATM during the automated test to the ATCC, and 4) awaiting any instructions for any further download/test process from the ATCC; and wherein the ATCC is further for dispatching test cases to the ATM according to a prescribed test schedule, further as a function of prescribed characteristics, wherein the prescribed characteristics include one of the following selected from the group consisting of: a) numerical weights determined as a function of a hardware configuration and performance history of a respective ATM, b) a supported operating system (OS) and hardware combination of a respective ATM, c) a number of queued test cases awaiting execution by a respective ATM, and d) a test case priority.

2. The architecture of claim 1, further comprising a remote web terminal, the remote web terminal for coupling to the ATS Server and enabling an access to the ATCC, the remote web terminal further for use in formulating a desired download/test process for execution by the ATM, according to a prescribed priority as determined by the ATCC.

3. The architecture of claim 2, wherein the remote web terminal is further for receiving results of a desired download/test process from the ATM via the ATCC.

4. The architecture of claim 1, wherein the ATM includes a plurality of ATMs, each of the ATMs characterized by a prescribed configuration.

5. The architecture of claim 1, wherein the ATM client software initially resides on a bootable device of the ATM, the client software further including instructions processable by the processor for moving the ATM client software to a RAM drive and erasing a content of the corresponding bootable device, dynamically generating files, including a version of the ATM client software, and copying the dynamically generated files onto the bootable device for performing a next operating system (OS)/Application software download/test process as directed by the ATCC.

6. The architecture of claim 1, wherein the ATM client software includes instructions for allowing ATM system re-boots and further includes instructions for passing a control of the ATM to the bootable device of a respective ATM.

7. The architecture of claim 1, wherein the ATM client software further includes instructions for conducting a prescribed automated test and for posting test results in the form of test result data of the prescribed automated download/test process to the ATCC on the ATS Server, wherein the ATCC analyzes the test result data and issues subsequent ATM client software instructions based upon an outcome of test result analyses of previously performed download/test processes.

8. A computer system factory download automated test process architecture comprising:

at least one automated test server (ATS Server);

at least one automated test control center (ATCC) software program operable within said at least one automated test server for performing prescribed functions of a factory download automated test process;

at least one automated test machine (ATM) characterized by a prescribed configuration having at least one processor, at least one bootable device, and automated test machine client software, the at least one bootable device for storing the ATM client software, and the at least one processor for executing the ATM client software, in response to a prescribed boot, for controlling an operation of a prescribed download/test process of a respective ATM during the factory download automated test process, and for a respective ATM, the ATM client software for 1) retrieving installation files and test instructions from the at least one ATCC, 2) passing control to the respective ATM upon a receipt of the installation files and test instructions for the ATM to perform at least one automated test according to the installation files and test instructions, 3) responsive to regaining a control subsequent a performance of the at least one automated test by the ATM, the ATM client software for copying any test result files generated by ATM during the automated test to the ATCC, and 4) awaiting any instructions for any further download/test process from the ATCC and wherein the ATM client software initially resides on a bootable device of said at least one ATM, the client software further including instructions processable by the processor for moving the ATM client software to a RAM drive and erasing a content of the corresponding bootable device, dynamically generating files, including at least a version of the ATM client software, and copying the dynamically generated files onto the bootable device for performing a next operating system (OS)/Application software download/test process as directed by the ATCC;

at least one remote web terminal, said at least one remote web terminal for coupling to said at least one ATS Server and enabling an access to said at least one ATCC, said at least one remote web terminal further for use in formulating a desired download/test process for execution by one of said at least one ATM, according to a prescribed priority as determined by said at least one ATCC, wherein said at least one remote web terminal is further for receiving results of a desired download/test process from a selected one of said at least one ATM via said ATCC; and wherein said at least one ATCC is further for dispatching test cases to said at least one ATM according to a prescribed test schedule, further as a function of prescribed characteristics, wherein the prescribed characteristics include at least one of the following selected from the group consisting of: a) numerical weights determined as a function of a hardware configuration and performance history of a respective ATM, b) a supported operating system (OS) and hardware combination of a respective ATM, c) a number of queued test cases awaiting execution by a respective ATM, and d) a test case priority.

9. The architecture of claim 8, wherein the ATM client software includes instructions for allowing ATM system re-boots and further includes instructions for passing a control of the ATM to any one of the bootable devices of the at least one bootable devices of a respective ATM.

10. The architecture of claim 9, wherein the ATM client software further includes instructions for conducting a prescribed automated test and for posting test results in the form of test result data of the prescribed automated download/test process to said at least one ATCC on said ATS Server, wherein the ATCC analyzes the test result data and issues subsequent ATM client software instructions based upon an outcome of test result analyses of previously performed download/test processes.

11. A computer system factory download automated test method comprising:
providing at least one automated test system server (ATS Server);
providing at least one automated test control center (ATCC) software program operable within the at least one ATS Server for performing prescribed functions of a factory download automated test process;
providing at least one automated test machine (ATM) having at least one processor, at least one bootable device, and automated test machine client software, the at least one bootable device for storing the ATM client software, and the at least one processor for executing the ATM client software, in response to a prescribed boot, for controlling an operation of a prescribed download/test process of a respective ATM during the factory download automated test process, and for a respective ATM, the ATM client software for 1) retrieving installation files and test instructions from the at least one ATCC, 2) passing control to the respective ATM upon a receipt of the installation files and test instructions for the ATM to perform at least one automated test according to the installation files and test instructions, 3) responsive to regaining a control subsequent a performance of the at least one automated test by the ATM, the ATM client software for copying any test result files generated by ATM during the automated test to the ATCC, and 4) awaiting any instructions for any further download/test process from the ATCC; and
wherein the at least one ATCC is further for dispatching test cases to the at least one ATM according to a prescribed test schedule, further as a function of prescribed characteristics, wherein the prescribed characteristics include at least one of the following selected from the group consisting of: a) numerical weights determined as a function of a hardware configuration and performance history of a respective ATM, b) a supported operating system (OS) and hardware combination of a respective ATM, c) a number of queued test cases awaiting execution by a respective ATM, and d) a test case priority.

12. The method of claim 11, further comprising providing at least one remote web terminal, the at least one remote web terminal for coupling to the at least one ATS Server and enabling an access to the at least one ATCC, the at least one remote web terminal further for use in formulating a desired download/test process for execution by one of the at least one ATM, according to a prescribed priority as determined by the at least one ATCC.

13. The method of claim 12, wherein the at least one remote web terminal is further for receiving results of a desired download/test process from a selected one of the at least one ATM via the ATCC.

14. The method of claim 11, wherein the at least one ATM includes a plurality of automated test machines (ATMs), each of the ATMs characterized by a prescribed configuration.

15. The method of claim 11, wherein the ATM client software initially resides on a bootable device of the at least one ATM, the client software further including instructions processable by the processor for moving the ATM client software to a RAM drive and erasing a content of the corresponding bootable device, dynamically generating files, including at least a version of the ATM client software, and copying the dynamically generated files onto the bootable device for performing a next operating system (OS)/application software download/test process as directed by the ATCC.

16. The method of claim 11, wherein the ATM client software includes instructions for allowing ATM system re-boots and further includes instructions for passing a control of the ATM to any one of the bootable devices of the at least one bootable devices of a respective ATM.

17. The method of claim 11, wherein the ATM client software further includes instructions for conducting a prescribed automated test and for posting test results in the form of test result data of the prescribed automated download/test process to the at least one ATCC on the ATS Server, wherein the ATCC analyzes the test result data and issues subsequent ATM client software instructions based upon an outcome of test result analyses of previously performed download/test processes.

18. A computer system factory download automated test process architecture comprising:
an automated test system server (ATS Server);
an automated test control center (ATCC) software program operable within the ATS Server for performing prescribed functions of a factory download automated test process;
an automated test machine (ATM) having a processor, a bootable device, and automated test machine client software, the bootable device for storing the ATM client software, and the processor for executing the ATM client software, in response to a prescribed boot, for controlling an operation of a prescribed download/test process of a respective ATM during the factory download automated test process, and for a respective ATM, the ATM client software for 1) retrieving installation files and test instructions from the ATCC, 2) passing control to the respective ATM upon a receipt of the installation files and test instructions for the ATM to perform at least one automated test according to the installation files and test instructions, 3) responsive to regaining a control subsequent a performance of the automated test by the ATM, the ATM client software for copying any test result files generated by the ATM during the automated test to the ATCC, and 4) awaiting any instructions for any further download/test process from the ATCC; and
wherein the ATM client software initially resides on a bootable device of the ATM, the client software further including instructions processable by the processor for moving the ATM client software to a RAM drive and erasing a content of the corresponding bootable device, dynamically generating files, including a version of the ATM client software, and copying the dynamically generated files onto the bootable device for performing a next operating system (OS)/Application software download/test process as directed by the ATCC.

19. A computer system factory download automated test process architecture comprising:
an automated test system server (ATS Server);
an automated test control center (ATCC) software program operable within the ATS Server for performing prescribed functions of a factory download automated test process;

an automated test machine (ATM) having a processor, a bootable device, and automated test machine client software, the bootable device for storing the ATM client software, and the processor for executing the ATM client software, in response to a prescribed boot, for controlling an operation of a prescribed download/test process of a respective ATM during the factory download automated test process, and for a respective ATM, the ATM client software for 1) retrieving installation files and test instructions from the ATCC, 2) passing control to the respective ATM upon a receipt of the installation files and test instructions for the ATM to perform at least one automated test according to the installation files and test instructions, 3) responsive to regaining a control subsequent a performance of the automated test by the ATM, the ATM client software for copying any test result files generated by the ATM during the automated test to the ATCC, and 4) awaiting any instructions for any further download/test process from the ATCC; and wherein the ATM client software further includes instructions for conducting a prescribed automated test and for posting test results in the form of test result data of the prescribed automated download/test process to the ATCC on the ATS Server, wherein the ATCC analyzes the test result data and issues subsequent ATM client software instructions based upon an outcome of test result analyses of previously performed download/test processes.

20. A computer system factory download automated test process architecture comprising:

at least one automated test server (ATS Server);

at least one automated test control center (ATCC) software program operable within said at least one automated test server for performing prescribed functions of a factory download automated test process;

at least one automated test machine (ATM) characterized by a prescribed configuration having at least one processor, at least one bootable device, and automated test machine client software, the at least one bootable device for storing the ATM client software, and the at least one processor for executing the ATM client software, in response to a prescribed boot, for controlling an operation of a prescribed download/test process of a respective ATM during the factory download automated test process, and for a respective ATM, the ATM client software for 1) retrieving installation files and test instructions from the at least one ATCC, 2) passing control to the respective ATM upon a receipt of the installation files and test instructions for the ATM to perform at least one automated test according to the installation files and test instructions, 3) responsive to regaining a control subsequent a performance of the at least one automated test by the ATM, the ATM client software for copying any test result files generated by ATM during the automated test to the ATCC, and 4) awaiting any instructions for any further download/test process from the ATCC, and wherein the ATM client software initially resides on a bootable device of said at least one ATM, the client software further including instructions processable by the processor for moving the ATM client software to a RAM drive and erasing a content of the corresponding bootable device, dynamically generating files, including at least a version of the ATM client software, and copying the dynamically generated files onto the bootable device for performing a next operating system (OS)/Application software download/test process as directed by the ATCC;

at least one remote web terminal, said at least one remote web terminal for coupling to said at least one ATS Server and enabling an access to said at least one ATCC, said at least one remote web terminal further for use in formulating a desired download/test process for execution by one of said at least one ATM, according to a prescribed priority as determined by said at least one ATCC, wherein said at least one remote web terminal is further for receiving results of a desired download/test process from a selected one of said at least one ATM via said ATCC; and wherein the ATM client software further includes instructions for conducting a prescribed automated test and for posting test results in the form of test result data of the prescribed automated download/test process to said at least one ATCC on said ATS Server, wherein the ATCC analyzes the test result data and issues subsequent ATM client software instructions based upon an outcome of test result analyses of previously performed download/test processes.

21. A computer system factory download automated test method comprising:

providing at least one automated test system server (ATS Server);

providing at least one automated test control center (ATCC) software program operable within the at least one ATS Server for performing prescribed functions of a factory download automated test process;

providing at least one automated test machine (ATM) having at least one processor, at least one bootable device, and automated test machine client software, the at least one bootable device for storing the ATM client software, and the at least one processor for executing the ATM client software, in response to a prescribed boot, for controlling an operation of a prescribed download/test process of a respective ATM during the factory download automated test process, and for a respective ATM, the ATM client software for 1) retrieving installation files and test instructions from the at least one ATCC, 2) passing control to the respective ATM upon a receipt of the installation files and test instructions for the ATM to perform at least one automated test according to the installation files and test instructions, 3) responsive to regaining a control subsequent a performance of the at least one automated test by the ATM, the ATM client software for copying any test result files generated by ATM during the automated test to the ATCC, and 4) awaiting any instructions for any further download/test process from the ATCC; and wherein the ATM client software initially resides on a bootable device of the at least one ATM, the client software further including instructions processable by the processor for moving the ATM client software to a RAM drive and erasing a content of the corresponding bootable device, dynamically generating files, including at least a version of the ATM client software, and copying the dynamically generated files onto the bootable device for performing a next operating system (OS)/application software download/test process as directed by the ATCC.

22. A computer system factory download automated test method comprising:

providing at least one automated test system server (ATS Server);

providing at least one automated test control center (ATCC) software program operable within the at least one ATS Server for performing prescribed functions of a factory download automated test process;

providing at least one automated test machine (ATM) having at least one processor, at least one bootable device, and automated test machine client software, the at least one bootable device for storing the ATM client software, and the at least one processor for executing the ATM client software, in response to a prescribed boot, for controlling an operation of a prescribed download/test process of a respective ATM during the factory download automated test process, and for a respective ATM, the ATM client software for 1) retrieving installation files and test instructions from the at least one ATCC, 2) passing control to the respective ATM upon a receipt of the installation files and test instructions for the ATM to perform at least one automated test according to the installation files and test instructions, 3) responsive to regaining a control subsequent a performance of the at least one automated test by the ATM, the ATM client software for copying any test result files generated by ATM during the automated test to the ATCC, and 4) awaiting any instructions for any further download/test process from the ATCC; and wherein the ATM client software further includes instructions for conducting a prescribed automated test and for posting test results in the form of test result data of the prescribed automated download/test process to the at least one ATCC on the ATS Server, wherein the ATCC analyzes the test result data and issues subsequent ATM client software instructions based upon an outcome of test result analyses of previously performed download/test processes.

* * * * *